United States Patent
Mendes

[19]

[11] Patent Number: 5,845,600
[45] Date of Patent: Dec. 8, 1998

[54] PET WATER DISPENSER WITH A LOW WATER LEVEL CONDITION INDICATOR

[76] Inventor: Carlos I. Mendes, 2116 Hatteras Point, Lakeland, Fla. 33813

[21] Appl. No.: 49,224

[22] Filed: Mar. 27, 1998

[51] Int. Cl.$^6$ ........................................................ A01K 5/02
[52] U.S. Cl. ............................................................ 119/51.5
[58] Field of Search .................................. 119/51.5, 52.1, 119/54, 61, 72, 74, 75

[56] References Cited

U.S. PATENT DOCUMENTS

| | | | |
|---|---|---|---|
| 4,640,229 | 2/1987 | Swartzendruber et al. | 119/51.11 |
| 5,033,412 | 7/1991 | Brennan et al. | 119/72 |
| 5,433,171 | 7/1995 | Ewell | 119/51.5 |

Primary Examiner—Thomas Price
Attorney, Agent, or Firm—George A. Bode; Lisa D. Charouel; Bode & Associates

[57] ABSTRACT

A pet dispenser having an outer cylindrical housing with a top lid and an inner cylindrical water container essentially concentric with and inverted in the outer cylindrical housing for storing and automatically dispensing water into a trough to maintain a predetermined water level in said trough. A magnetically responsive switch is coupled to an interior surface of the top lid of the outer cylindrical housing. A low water level condition indicator is externally coupled to the top lid and electrically coupled to the magnetically responsive switch. A magnetic float in the inner cylindrical water container transitions the magnetically responsive switch from an open state to a closed state when as the water level in the inner water container goes below a predetermined level.

20 Claims, 3 Drawing Sheets

PET WATER DISPENSER WITH A LOW WATER LEVEL CONDITION INDICATOR

BACKGROUND OF THE INVENTION

1. Field of the Invention

The present invention relates to water dispensers for pets and, more particularly, to a pet water dispenser with a low water level condition indicator actuated by a magnetically actuated switching means.

2. General Background

Pet water dispensers which include a means for determining a low water level condition to activate an alarm or replenish the water supply are known. Thereby, the pet's water supply can be maintained so that the pet does not run out of water.

Several apparatuses have been patented which are aimed at pet water dispensers.

U.S. Pat. No. 3,112,733, to Arnott, entitled "PET DRINKING FOUNTAIN" discloses a pet drinking fountain having a cylindrical container having a base for supporting the container. The base has an opening formed therein for dispensing water to a trough. A water gauge is provided on the outer surface of the cylindrical container to visually indicate the level of the water in the dispenser.

U.S. Pat. No. 3,720,184, to Pearce, entitled "COMBINATION PET FEEDER FOR FLOWABLE SOLID MATERIAL AND LIQUID" discloses an outer cylindrical container and an inner cylindrical container concentric with the outer cylindrical container. The inner cylindrical container has a spout and is inverted so that water is free to flow through the spout into a trough. The trough (feeding dish) has a ramp with a ledge forming a platform and shoulder on which the spout normally rests to controllably feed liquid by partially obstructing the orifice of the spout.

U.S. Pat. No. 4,000,719, to Richards, entitled "AUTOMATIC PET FEED DISPENSER" discloses an automatic pet feed dispenser having a feed drum which is rotated about a vertical spindle via a motor. The drum is divided into bins which has hinged panels which drop as they move into place over a chute to drop dry feed into a tray. Water is added to a feed tray from a metering chamber wherein the metering chamber is refilled via a float-actuated fill valve.

U.S. Pat. No. 4,922,226, to Hsieh et al., entitled "WATER LEVEL AND TEMPERATURE DETECTOR ALARM DEVICE" discloses a buoy-type detector having a magnet and upper and lower reed switches wherein as the water level rises to a predetermined range, the magnet attracts the lower reed switch to activate a buzzer. When the magnet reaches the upper reed switch the buzzer is activated again.

U.S. Pat. No. 4,988,978, to Soto, entitled "LIQUID LEVEL INDICATOR FOR STORAGE TANKS" discloses a float movably disposed on a central rod, a vertically movable first rod assembly connected to an upper portion of the central rod and a vertically movable second rod assembly connected to a lower portion of the central rod. The float is disposed between the first rod assembly and the second rod assembly. The float contacts and moves the first rod assembly when the storage tank is filled to activate an indicator. Additionally, the float contacts and moves the second rod assembly when the tank is near empty to activate another indicator.

U.S. Pat. No. 5,297,504, to Carrico, entitled "PET WATER SAVER" discloses a container for transporting animals having a water dispenser. The water dispenser has a water level replenishing means having a mercury switch, float valve or reed switch to detect changes in the water level for actuating a pump for transferring water from an external reservoir to a refill dish.

U.S. Pat. No. 5,428,348, to Gault, entitled "FLUID LEVEL MONITOR" discloses a battery-operated fluid level monitor having a sensor suspended in water wherein when the water level is low the sensor activates an indicator.

U.S. Pat. No. 5,610,591, to Gallagher, entitled "LIQUID LEVEL ALARM SYSTEM" discloses a container for storing therein water having a switch arm mounted therein. The switch arm has a float suspended therein wherein the float is a weight so that when the water level is low the weight pulls the switch arm to activate an alarm.

Soviet Patent No. SU 1290-081-A issued to Kiev Autom Inst discloses a float having a permanent magnet with radial magnetization. The container has an indicator base strip affixed to an exterior wall which carries a number of tabs which bend in the vicinity of a field, going one way or the other according to polarity.

SUMMARY OF THE PRESENT INVENTION

The preferred embodiment of the pet water dispenser of the present invention solves the aforementioned problems in a straight forward and simple manner. What is provided is a pet water dispenser with a low water level condition indicator actuated by a magnetically responsive switching means.

The pet water dispenser includes an outer cylindrical housing having the magnetically responsive switching means coupled to a top lid thereof and an inner cylindrical water container essentially concentric with and inverted in the outer cylindrical housing for automatically dispensing water to a pet in a trough. The inner cylindrical housing has coupled to a top wall thereof a guide member having slidably mounted thereon a magnetic float. When the inner cylindrical water container is full a magnetic force of influence is exerted by the magnetic float to maintain the magnetically responsive switching means in an open state. When the water level in the inner cylindrical water container decreases, the distance between the magnetically responsive switching means and the magnetic float increases thereby weakening the magnetic force of influence exerted by magnetic float on magnetically responsive switching means. When the water level in the inner cylindrical water container reaches a predetermined low level, the magnetic force of influence exerted by magnetic float on magnetically responsive switching means diminishes its force to a point which allows magnetically responsive switching means to automatically change from an open state to a closed state. In such closed state, the magnetically responsive switching means turns on a low water level condition indicator.

Additionally, the magnetic float has a first predetermined length and the guide member has a second predetermined length longer than the first predetermined length. The total sum of the first predetermined length and the second predetermined length is greater than a length of the cylindrical wall structure of the inner cylindrical water container to prevent the magnetic float from completely sliding off of the guide member when the inner cylindrical water container is inverted and empty and, alternately, when non-inverted.

In view of the above, it is an object of the present invention to provide a pet water dispenser which dispenses water into a trough, automatically replenishes the water in the trough to maintain a predetermined water level in the trough and monitors its water level to activate a low water level condition indicator to notify, visually, the pet owner that the water level in the water dispenser is low.

Another object of the invention is to provide a low water level condition indicator which is a visual indicator, such as, an LED. Nevertheless, the low water level condition indicator may be an audible indicator.

More specifically, the pet water dispenser of the present invention includes an outer cylindrical housing having a top lid and an inner cylindrical water container essentially concentric with and inverted in the outer cylindrical housing for storing and automatically dispensing water to a pet into a trough to maintain a predetermined water level in said trough wherein said inner cylindrical water container has a base wall which is in close proximity to said top lid. The improvement of the present invention comprises: a magnetically responsive means for switching coupled to an interior surface of said top lid of said an outer cylindrical housing and having an open state and a closed state; a low water level condition indicator externally coupled to said top lid and electrically coupled to said magnetically responsive switching means; a guide member fixedly coupled in a center of said base wall wherein said guide member is suspended in said inner cylindrical water container along a longitudinal axis thereof; and, a magnetic float slidable coupled to said guide member and having a magnetic force of influence wherein the force exerted on said magnetically responsive switching means by of said magnetic force of influence is inversely proportional to a distance between said magnet float and said magnetically responsive switching means wherein, said magnetic force of influence maintains said magnetically responsive switching means in said open state when said distance is less than a predetermined amount and when said distance is greater than said predetermined amount said force exerted on said magnetically responsive switching means by said magnetic force of influence is diminished to a point which allows said magnetically responsive switching means to automatically transition to said closed state to automatically actuate a low water level condition indicator.

In view of the above objects, it is a feature of the present invention to provide a pet water dispenser with a low water level condition indicator which is simple to use.

Another feature of the present invention is to provide a pet water dispenser with a low water level condition indicator which is relatively simple structurally and simple to manufacture.

The above objects and other features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
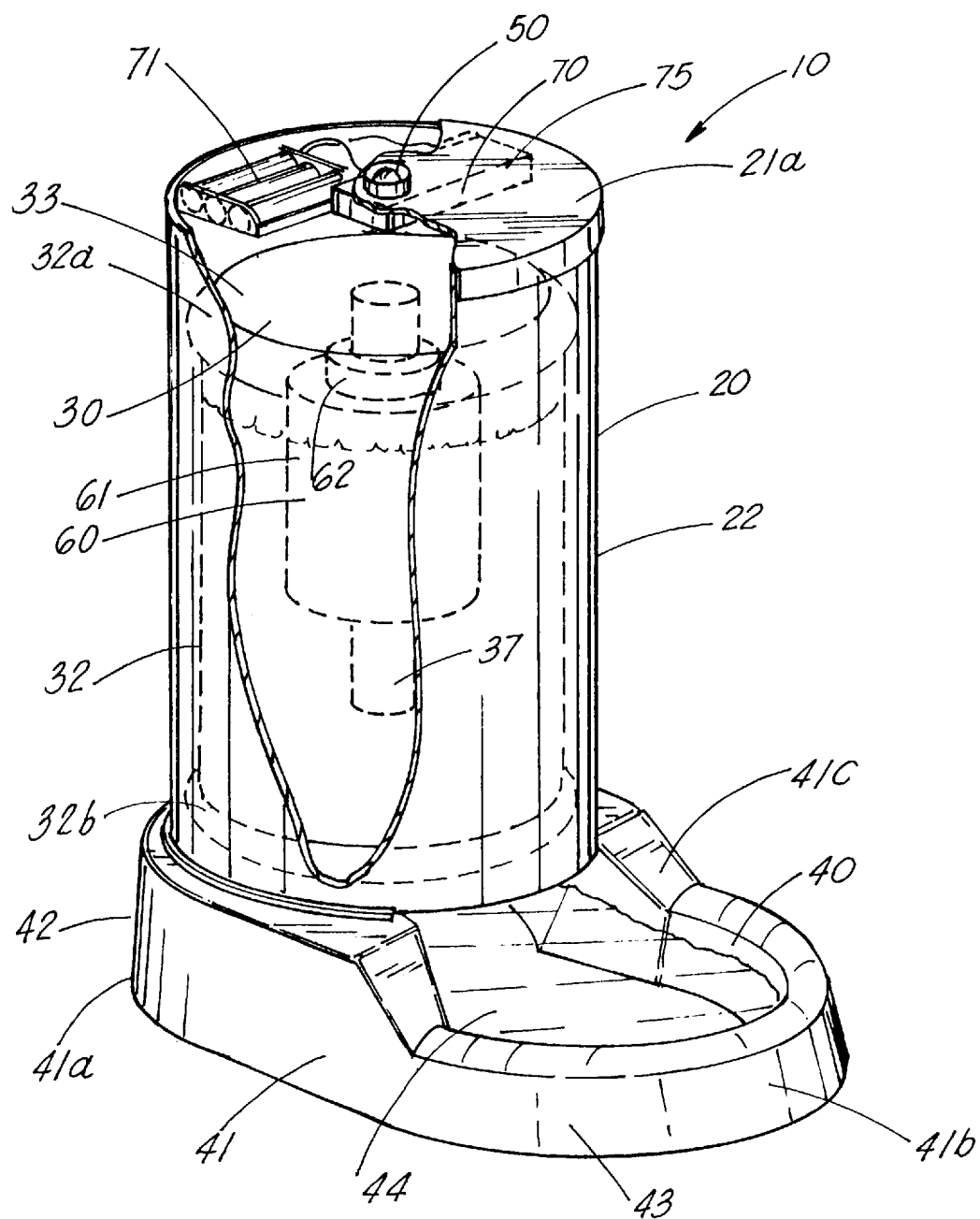
FIG. 1 illustrates a perspective view from the pet water dispenser of the present invention having a portion of the outer cylindrical housing partially removed.
Figure 2:
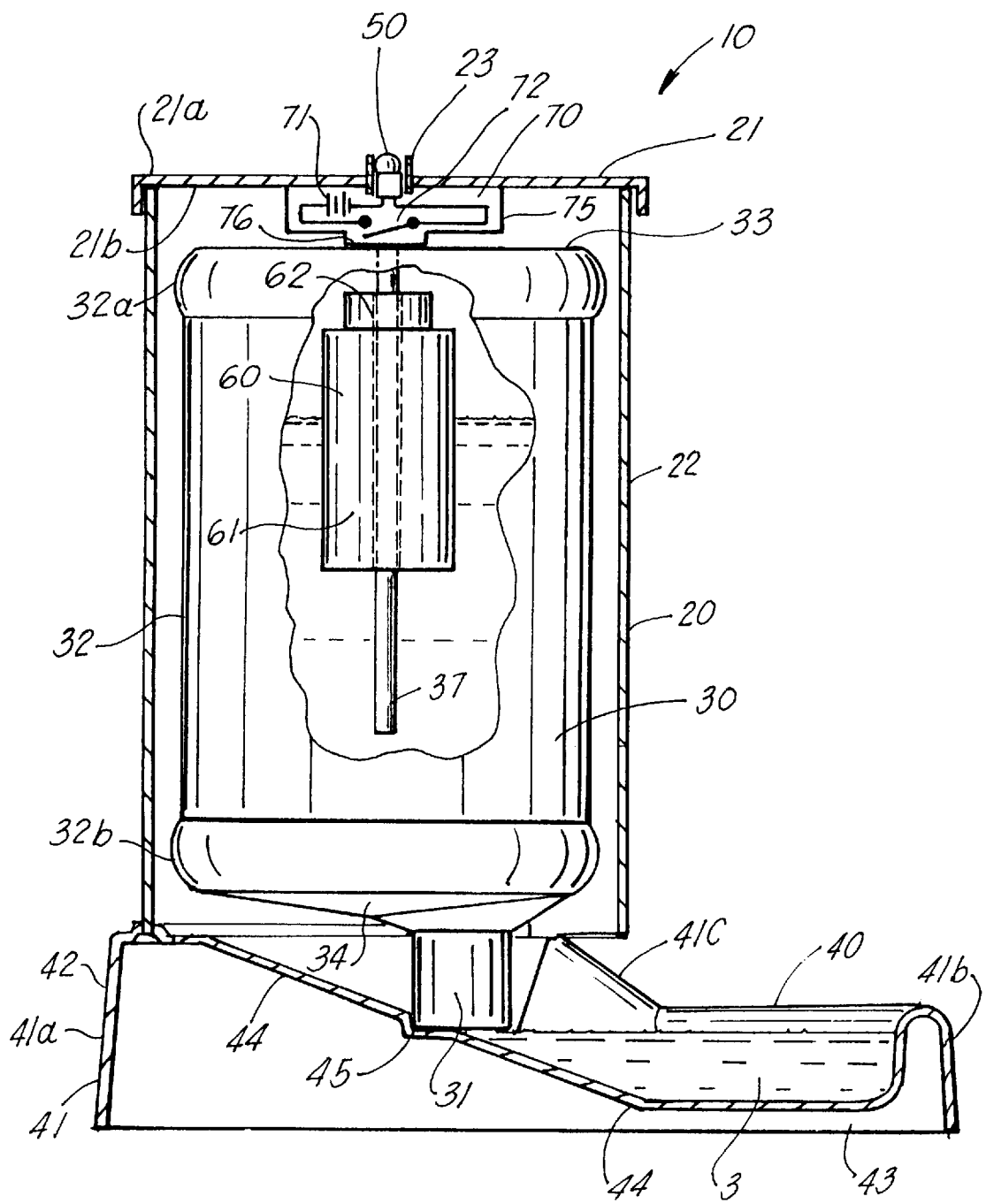
FIG. 2 illustrates a cross-sectional view of the pet water dispenser of the embodiment of FIG. 1 with the switching means in the open state wherein a portion of the inner cylindrical water container is partially removed; and, FIG. 3 illustrates a cross-sectional view of the pet water dispenser of the embodiment of FIG. 1 with the switching means in the closed state wherein a portion of the inner cylindrical water container is partially removed.
Figure 3:
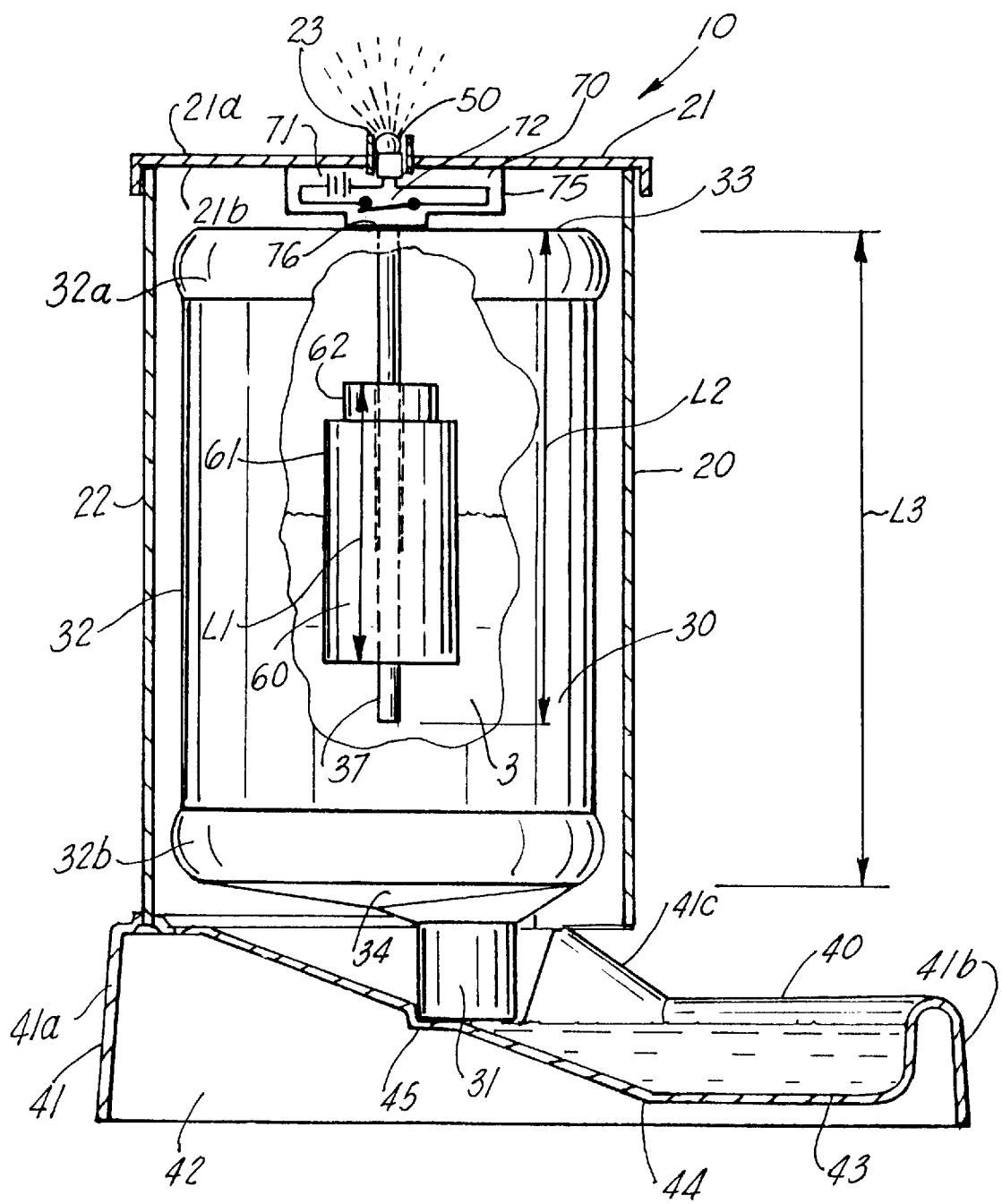

Referring now to the drawing, and in particular FIGS. 1–3, the pet dispenser of the present invention is designated generally by the numeral 10. Pet dispenser 10 is generally comprised of outer cylindrical housing 20, inner cylindrical water container 30, trough 40, visual indicator 50, magnetic float 60 and magnetically responsive switching means 70.

Outer cylindrical housing 20 has removable top lid 21 and cylindrical wall structure 22 wherein the removable top lid 21 is coupled to the top edge of cylindrical wall structure 22. The bottom edge of cylindrical wall structure 22 is coupled to trough 40.

Removable top lid 21 has outer surface 21a and interior surface 21b. Outer surface 21a has formed in the center thereof aperture 23 for receiving therein visual indicator 50 which is visually observable externally. Interior surface 21b has fixedly coupled thereto magnetically responsive switching means 70.

Magnetically responsive switching means 70 comprises battery means 71 and switching element 72 wherein switching element 72 is coupled to visual indicator 50. In the preferred embodiment, switching element 72 is a reed switch which is normally opened to an open state as best seen in FIG. 2. When switching element 72 is in the open state, visual indicator 50 is turned off such that visual indicator 50 is not illuminated.

Magnetically responsive switching means 70 is housed in housing 75. Bottom surface 76 of housing 75 is disposed a predetermined distance within housing outer cylindrical housing 20 to provide the necessary clearance for inner cylindrical water container 30 when top lid 21 is closed.

Inner cylindrical water container 30 having spout 31 stores therein water 3 to be dispensed in trough 40. Inner cylindrical water container 30 is concentric with and inverted in outer cylindrical housing 20 to allow water 3 to flow into trough 40 through spout 31. Spout 31 is cylindrically shaped.

In order to replenish inner cylindrical water container 30 with water, top lid 21 of outer cylindrical housing 20 is opened and inner cylindrical water container 30 is removed and inverted from its inverted position. Water is filled in inner cylindrical water container 30 via the opening in spout 31.

Since inner cylindrical water container 30 is inverted as shown, inner cylindrical water container 30 will be described in such inverted position.

Inner cylindrical water container 30 includes top and bottom enlarged ribs or bulges 32a and 32b formed in cylindrical wall structure 32. The top edge of top enlarged rib 31 has coupled thereto wall 33 for closing the top edge of inner cylindrical water container 30. As can be readily seen, wall 33 is a base wall for inner cylindrical water container 30 so that when inner cylindrical water container 30 is removed from outer cylindrical housing 20 the essentially horizontal surface of the base wall serves to support inner cylindrical water container 30 when placed on a counter or table. Spout 31, coupled to enclosing bottom surface 34, is offset to one side from the center axis of inner cylindrical water container 30.

Inner cylindrical wall container 30 further comprises guide member 37 fixedly coupled to wall 33 wherein guide member 37 is suspended in inner cylindrical water container 30 along the center (longitudinal) axis thereof. Guide member 37 is a rod having a predetermined length L2.

Magnetic float 60 comprises float member 61 and magnet 62 wherein float member 61 supports magnet 62 on its top side. Thereby, the magnetic force of influence with respect to magnetically responsive switching means 70 is maximized. Float member 61 and magnet 62 are slidable coupled to guide member 37 wherein when the water level in inner cylindrical water container 30 is full, float member 61 slidably floats toward wall 33 such that magnet 62 essentially abuts the horizontal surface of wall 33. When magnet 62 abuts the horizontal surface of wall 33, the magnet force of influence exerted by magnet 62 on magnetically responsive switching means 70 is maximized. Since magnet 62 is in relatively close proximity to switching element 72 of magnetically responsive switching means 70 when inner cylindrical water container 30 is full the magnetic force of influence exerted by magnet 62 maintains switching element 72 in the open state.

As the water level in inner cylindrical water container 30 decreases, float member 61 and magnet 62 slide downward along guide member 37 in inner cylindrical water container 30 wherein the distance between magnet 62 and switching element 72 of magnetically responsive switching means 70 increases. As the distance between magnet 62 and switching element 72 increases the magnetic force of influence decreases.

When the water level in the inner cylindrical water container 30 reaches a predetermined low level, the magnetic force of influence exerted by magnetic 62 of magnetic float 60 on magnetically responsive switching means 70 diminishes to a point which allows magnetically responsive switching means to automatically change from an open state to a closed state, as best seen in FIG. 3. In such closed state, the magnetically responsive switching means 70 turns on visual indicator 50. When switching element 72 switches to the closed state, visual indicator 50 is illuminated to indicate a low water level condition.

Magnetic float 60 has a predetermined length L1 and guide member 37 has a predetermined length L2 wherein the total sum of length L1 and length L2 is greater than the length L3 of cylindrical wall structure 32 from wall 33 to enclosing bottom surface 34. Thereby, if the water is fully emptied from inner cylindrical water container 30, magnetic float 60 does not completely slide off of guide member 37. Additionally, when inner cylindrical water container 30 is non-inverted such as when removed from outer cylindrical housing 20 magnetic float 60 is not capable of sliding off of guide member 37.

Trough 40 has an essentially elliptically shaped outer perimeter contour defined by an elliptically shaped side wall 41. In the exemplary embodiment, elliptically shaped side wall 41 comprises two vertical walls in side-by-side spaced relation and joined together via a top surface. Trough 40 has rear portion 42 and front portion 43 wherein elliptically shaped side wall portion 41a of rear portion 42 has a height higher then the height of elliptically shaped side wall portion 41b of front portion 43. As elliptically shaped side wall portion 41a of rear portion 42 transitions to the lower height of elliptically shaped side wall portion 41b of front portion 43, elliptically shaped side wall portion 41c is sloped.

The bottom edge of cylindrical wall structure 22 is coupled to the top surface of elliptically shaped side all portion 41a of trough 40.

Trough 40 further comprises trough floor 44. Trough floor 44 gradually slopes downwardly beginning from the top of elliptically shaped side wall portion 41a wherein the sloping contour terminates at the forward end of elliptically shaped side wall portion 41c. Thereafter, trough floor 44 is essentially parallel to the horizontal plane.

Trough floor 44 further comprises notch 45 formed therein to form a flat ledge. The rear portion of spout 31 seats in notch 45 wherein the ledge partially obstructs the flow of water 3 through spout 31.

In operation, water 3 flowing through spout 31 will flow into trough 40 to a particular water level. As the water level decreases below such particular water level, water 3 will automatically be replenished in trough 40. More specifically, when the opening of spout 31 in which water flows is not fully submerged in water 3 in trough 40, air is permitted to enter in inner cylindrical water container 30 which in turn forces water in inner cylindrical water container 30 out through the opening in spout 31 until the opening in spout 31 becomes submerged in water 3 in trough 40. As can be appreciated, water 3 in trough 40 is replenished automatically to maintain the particular water level.

When the water level in inner cylindrical water container 30 decreases to a predetermined level, magnet float 60 floats downward such that the magnetic force exerted by magnet 62 decreases to a point to allow the switching element 72 to transition to a closed state. When switching element 72 is in a closed state visual indicator 50 is illuminated to visually indicate a low water level condition.

As can be appreciated, visual indicator 50 may be replaced with an audible indicator, such as, a buzzer. Alternately, an audible indicator may be provided in addition to visual indicator 50.

In the preferred embodiment, wherein trough 40, outer cylindrical housing 20 and inner cylindrical water container 30 are made of plastic.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A pet water dispenser having an outer cylindrical housing having a top lid and an inner cylindrical water container essentially concentric with and inverted in the outer cylindrical housing for storing and automatically dispensing water to a pet into a trough to maintain a predetermined water level in said trough wherein said inner cylindrical water container has a base wall which is in close proximity to said top lid, the improvement comprising:

a magnetically responsive means for switching coupled to an interior surface of said top lid of said outer cylindrical housing and having an open state and a closed state;

a visual means for indicating externally coupled to said top lid and electrically coupled to said magnetically responsive switching means;

a guide member fixedly coupled in a center of said base wall wherein said guide member is suspended in said inner cylindrical water container along a longitudinal axis thereof; and, a magnetic float slidable coupled to said guide member and having a magnetic force of influence wherein the force exerted on said magnetically responsive switching means by of said magnetic force of influence is inversely proportional to a distance between said magnet float and said magnetically responsive switching means wherein, said magnetic force of influence maintains said magnetically responsive switching means in said open state when said distance is less than a predetermined amount and when said distance is greater than said predetermined amount said force exerted on said magnetically responsive switching means by said magnetic force of influence is diminished to a point which allows said magnetically responsive switching means to automatically transition to said closed state to automatically actuate said visual indicating means.

2. The apparatus of claim 1, wherein said magnetic float comprises a floatation member and a magnet coupled to a top side of said floatation member and wherein, when a water level in said inner cylindrical water container is full, said floatation member slides along said guide member to said base wall of said inner cylindrical water container.

3. The apparatus of claim 2, wherein, as said water level of said inner cylindrical water container decreases said floatation member and said magnet slide downward along said guide member thus increasing said distance between said magnet and said magnetically responsive switching means and weakening said magnetic force of influence exerted by said magnetic float on said magnetically responsive switching means.

4. The apparatus of claim 3, wherein said magnetic float has a first predetermined length and said guide member has a second predetermined length longer than said first predetermined length and wherein the sum of said first predetermined length and said second predetermined length is greater than a length of the cylindrical wall of said inner cylindrical water container to prevent said magnetic float from completely sliding off of said guide member when said inner cylindrical water container is inverted and empty and, alternately, when non-inverted.

5. The apparatus of claim 1, wherein said magnetically responsive switching means comprises a battery and a reed switch normally functioning in said open state.

6. The apparatus of claim 5, further comprising a housing coupled to an interior surface of said top lid for housing therein said magnetically responsive switching means.

7. The apparatus of claim 1, wherein said visual indicating means is an LED which is illuminated when said magnetically responsive switching means is in said closed state.

8. A pet water dispenser having an outer cylindrical housing having a top lid and an inner cylindrical water container essentially concentric with and inverted in the outer cylindrical housing for storing and automatically dispensing water to a pet into a trough to maintain a predetermined water level in said trough wherein said inner cylindrical water container has a base wall which is in close proximity to said top lid, the improvement comprising:
  a magnetically responsive means for switching coupled to the interior surface of said top lid of said outer cylindrical housing and having an open state and a closed state;
  a low water level condition indicator externally coupled to said top lid and electrically coupled to said magnetically responsive switching means;
  a guide member fixedly coupled in a center of said base wall wherein said guide member is suspended in said inner cylindrical water container along a longitudinal axis thereof; and,
  a magnetic float slidable coupled to said guide member and having a magnetic force of influence wherein the force exerted on said magnetically responsive switching means by said magnetic force of influence is inversely proportional to a distance between said magnet float and said magnetically responsive switching means wherein, said magnetic force of influence maintains said magnetically responsive switching means in said open state when said distance is less than a predetermined amount and when said distance is greater than said predetermined amount said force of said magnetic force of influence is diminished to a point which allows said magnetically responsive switching means to automatically transition to said closed state to automatically actuate said low water level condition indicator.

9. The apparatus of claim 8, wherein said magnetic float comprises a floatation member and a magnet coupled to a top side of said floatation member and wherein, when said a water level in said inner cylindrical water container is full, said floatation member slides along said guide member to said base wall of said inner cylindrical water container.

10. The apparatus of claim 9, wherein, as said water level of said inner cylindrical water container decreases said floatation member and said magnet slide downward along said guide member thus increasing said distance between said magnet and said magnetically responsive switching means and weakening said magnetic force of influence exerted by said magnetic float on said magnetically responsive switching means.

11. The apparatus of claim 9, wherein said magnetic float has a first predetermined length and said guide member has a second predetermined length longer than said first predetermined length and wherein the sum of said first predetermined length and said second predetermined length is greater than a length of the cylindrical wall of said inner cylindrical water container to prevent said magnetic float from completely sliding off of said guide member when said inner cylindrical water container is inverted and empty and, alternately, when non-inverted.

12. The apparatus of claim 8, wherein said magnetically responsive switching means comprises a battery and a reed switch normally functioning in said open state.

13. The apparatus of claim 12, further comprising a housing coupled to an interior surface of said top lid for housing therein said magnetically responsive switching means.

14. The apparatus of claim 8, wherein said low water level condition indicator is an LED which is illuminated when said magnetically responsive switching means is in said closed state.

15. A pet water dispenser comprising:
  an outer cylindrical housing having a top lid;
  an inner cylindrical water container essentially concentric with and inverted in the outer cylindrical housing for storing and automatically dispensing water to into a trough to maintain a predetermined water level in said trough wherein said inner cylindrical water container has a length and has a base wall which is in close proximity to said top lid when inverted;
  a magnetically responsive means for switching coupled to the interior surface of said top lid of said outer cylindrical housing and having an open state and a closed state;
  a low water level condition indicator externally coupled to said top lid and electrically coupled to said magnetically responsive switching means;
  a guide member fixedly coupled in a center of said base wall wherein said guide member has a first predetermined length and is suspended in said inner cylindrical water container along a longitudinal axis thereof; and,
  a magnetic float slidable coupled to said guide member and having a second predetermined length and a magnetic force of influence wherein the force exerted on said magnetically responsive switching means by said magnetic force of influence is inversely proportional to a distance between said magnet float and said magnetically responsive switching means wherein, said magnetic force of influence maintains said magnetically responsive switching means in said open state when said distance is less than a predetermined amount and when said distance is greater than said predetermined amount said force of said magnetic force of influence is diminished to a point which allows said magnetically responsive switching means to automatically transition to said closed state to automatically actuate said low water level condition indicator; and, wherein the sum of said first predetermined length and said second predetermined length is greater than said length of the cylindrical wall of said inner cylindrical water container to prevent said magnetic float from completely sliding off of said guide member when said inner cylindrical water container is inverted and empty and, alternately, non-inverted.

16. The apparatus of claim 15, wherein said magnetic float comprises a floatation member and a magnet coupled to a top side of said floatation member and wherein, when a water level in said inner cylindrical water container is full, said floatation member slides along said guide member to said base wall of said inner cylindrical water container.

17. The apparatus of claim 16, wherein, as said water level of said inner cylindrical water container decreases said floatation member and said magnet slide downward along said guide member thus increasing said distance between said magnet and said magnetically responsive switching means and weakening said magnetic force of influence exerted by said magnetic float on said magnetically responsive switching means.

18. The apparatus of claim 15, wherein said magnetically responsive switching means comprises a battery and a reed switch normally functioning in said open state.

19. The apparatus of claim 18, further comprising a housing coupled to an interior surface of said top lid for housing therein said magnetically responsive switching means.

20. The apparatus of claim 15, wherein said low water level condition indicator is an LED which is illuminated when said magnetically responsive switching means is in said closed state.

* * * * *